(12) United States Patent
Jencka (10) Patent No.: US 6,193,336 B1
(45) Date of Patent: Feb. 27, 2001

(54) HOLDER WITH RETAINING DEVICE FOR COMPACT DISC AND OTHER MEDIA CASES

(76) Inventor: Daniel Jencka, 5555 Roswell Rd. NE., Apt. #Q-14, Atlanta, GA (US) 30342

( * ) Notice: Subject to any disclaimer, the term of this patent is extended or adjusted under 35 U.S.C. 154(b) by 0 days.

(21) Appl. No.: 08/563,444

(22) Filed: Nov. 28, 1995

(51) Int. Cl.$^7$ ................................................. A47B 81/06
(52) U.S. Cl. ........................................ 312/9.57; 49/489.1
(58) Field of Search ............................... 49/480.1, 489.1, 49/498.1; 312/9.53, 9.55, 9.57, 9.63, 9.64

(56) References Cited

U.S. PATENT DOCUMENTS

| | | | |
|---|---|---|---|
| 3,117,352 | * | 1/1964 | Reahard et al. ................ 49/498.1 |
| 3,385,001 | * | 5/1968 | Bordner ......................... 49/489.1 |
| 4,715,669 | * | 12/1987 | Baillie et al. ................... 312/9.63 |
| 4,720,936 | * | 1/1988 | Ellington ....................... 49/489.1 |
| 5,080,231 | * | 1/1992 | Price, Jr. et al. ............... 312/9.53 |

* cited by examiner

Primary Examiner—Peter M. Cuomo
Assistant Examiner—Jerry A. Anderson
(74) Attorney, Agent, or Firm—Gene W. Arant (57) ABSTRACT

A holder (42) with retaining device for organizing compact disc cases and other such substantially rectangular media cases. The retaining device allows deposited items to be placed solitarily or adjacently in any available location, to be relocated simply by sliding them sideways, saves the vacant spaces left by withdrawn items, and will accommodate a variety of media case types, including compact disc cases of the single, multiple and slip-cased variety. A preferred embodiment of the holder has a substantially rectangular storage area (34) defined in part by opposed upper and lower shelves (36 & 40) located adjacent to an access opening (32) on the front side of the holder through which compact disc cases (50) and other such items are deposited in a side-by-side, book-like manner, coming to rest on and perpendicular to the interior surface of the lower shelf (40). The back wall (38) serves to stop deposited items from exiting out the rear side of the holder. The retaining device has two specialized components, an engagement member (18) and a guide (10) (which in a preferred embodiment of the invention are simultaneously formed as a unified device,) which are located on the interior side of the upper shelf (36), running parallel to the access opening (32) along the entire length of the storage area (34) so as to oppose the upper, proximate sides of deposited items. The engagement member (18) is an elongated resilient plastic structure with a retention face (24) orientated to frictionally hold compact disc cases (50) or other deposited items in place. The guide (10) is located adjacent to the engagement member (18) and has a low frictional guide surface (14) that is situated between the engagement member (18) and the access opening of the holder (30). The guide surface (14) serves to align the proximate sides of incoming items with the retention face (24) for subsequent frictional engagement. Other preferred embodiments of the invention have: the guide and engagement member formed as separate components; the guide made integral to the holder; alternate forms of the retaining device, and; holders with arched or angled storage areas.

5 Claims, 6 Drawing Sheets

HOLDER WITH RETAINING DEVICE FOR COMPACT DISC AND OTHER MEDIA CASES

BACKGROUND—FIELD OF INVENTION

This invention relates generally to holders made for storing and organizing media cases and other shelved items, and more particularly to a holder having a retaining device for keeping such items, and preferably media cases such as compact disc cases, in place.

BACKGROUND—DESCRIPTION OF PRIOR ART

There are several related and continuing problems found with holders which utilize retaining devices to organize compact disc (hereafter abbreviated to CD) cases and other families of such substantially rectangular media containers, cases, and cartridges. Such holders with retaining devices must overcome problems presented by a variety of media cases, including those which are specific to the storage and retention of CD cases. The following review and analysis of these continuing problems, and their partial solutions found in relevant prior art, will begin with a discussion of CD cases as they are the most problematic.

Standard CD cases are rectangular, hard plastic containers which, when standing upright in book-like fashion, are of uniform height and depth, but vary in width depending on the number of discs they are made to contain. A CD case containing a single disc is quite narrow, being only 0.4" wide, while a wider version made to hold two to four discs measures 0.95" in width. These plastic CD cases are often grouped together in paperboard boxes or slipcases that may also contain printed booklets. Such boxed-sets can be several inches wide. More critically, in terms of problems addressed by my invention, these paperboard boxes are slightly taller than the CD cases they contain, having up to 0.10" in additional height. Any retaining device utilized in an organizer for CD cases must accommodate these various dimensional differences, and one that successfully does so will work equally well with other more uniformly sized media containers and cartridges, such as audio or video tape cassettes, data or microfilm cartridges, and CD ROM, laser and floppy discs. For the sake of economy, all such containers and cartridges will hereafter be referred to as media cases except when pointing out special problems or features of CD cases, or when citing particular kinds of media cases specified in prior art references.

The one problem most common to storing and organizing media cases is the tendency for all such items, when arranged on a cabinet shelf or other such supporting structure in an upright and side-by-side fashion, to lean, fall over, slide, or otherwise migrate into neighboring spaces in the course of being accessed by a user. This makes it difficult to return an item to its original chosen space, or to maintain the overall order and neatness of a collection. While moveable bookends, or followers, can support several such items en-masse, they do not securely retain individual items within a group, nor are spaces left by withdrawn items well preserved for their later return.

Another familiar organizational device is that of partitions spaced apart to form slots or compartments sized to receive individual media cases. This approach has many drawbacks. The simplest re-ordering of such items in a collection requires their repetitive withdrawal and redeposit, one slot at a time, until each and every item has been individually relocated. Furthermore, such partition walls take up space that could otherwise be used to store additional items. Also, such partition walls are neither simple nor inexpensive to manufacture, and because CD cases and their slipcases vary in width, depending on the number of items they contain, and since it is natural for a collection to continually grow and change, any fixed set of differently sized compartments will rarely match or accommodate any user's collection.

A recently disclosed holder/retaining device combination, U.S. Pat. No. 5,080,231 (1992), utilizes a retaining device consisting of a series of consecutively adjacent spring-like fingers or levers. These are distributed along the length of a shelf that is situated over a storage area within a generally rectangular holder. Each such spring-like finger is orientated so that it is perpendicular to the plane of the open side of the holder, and with a broad side facing downward. These fingers resiliently press down against the top sides of deposited tape cartridges to frictionally hold them in place after they are inserted for storage. The referenced holder has vertical compartment walls to separate such items and to keep them from falling over.

If the previously cited holder had no compartments to keep deposited items from falling over, then the sides of its unengaged spring-like fingers would somewhat provide a lateral stop or support for the uppermost portion of adjacent cartridges. If the items to be engaged were narrow and prone to falling over, such as single-disc CD cases or floppy discs, these spring-like levers or fingers would have to be of matching width so that the engaged item's lateral motion would be limited as much as possible. Such a version of U.S. Pat. No. 5,080,231, with no individuated compartments, is available to the public from ALLSOP Inc., of Bellingham, Wash.

In another holder/retaining device combination, U.S. Pat. No. 4,715,669 (1987), an elongated pressure exerting retention strip is similarly located along the down-facing side of a holder's upper shelf to frictionally engage the top sides of microfilm cartridges deposited on the shelf below. The retention strip is constructed from a flat, sheet-like strip of resilient, deflectable material having a plurality of transfer slits running at right angles to its length, thereby forming a series of consecutively adjacent, independently flexible members. The entire retention strip is confined by the shelf structure in such a manner so as to distend these members in the direction of the cartridges to be engaged and held in place. The result is a series of convex, spring-like members that function very much like the spring-like fingers of the previously referenced patent, with similar factors involved in their size and spacing.

In both of these patented holders, narrow media cases such as those holding a single CD would have to be carefully deposited in close lateral alignment with any spring-like member or finger to be properly held in place by it, hence the use of compartments in U.S. Pat. No. 5,080,231. This required alignment could only rarely occur for individual members within a group of CD cases because each variously wide CD case determines the position of its neighbor, unlike the fixed and uniform spacing of the consecutively adjacent spring-like members or fingers under discussion. Also, when a media case is engaged by two spring-like fingers or members at once, which will happen as often as not, it is free to tip sideways until stopped or confined by another media case or by the side of an unengaged spring-like member or finger. General sloppiness and domino effects are inevitable. It would also be troublesome to relocate media cases by sliding them sideways because they will repeatedly catch on the sides of unengaged spring-like members or fingers.

In an alternative embodiment of U.S. Pat. No. 4,715,669, an elongated strip of compressible plastic foam is located along the length of a shelf structure opposed to a shelf below it where microfilm cartridges are deposited for storage. This strip is covered with a layer of mylar or other material having a low frictional sliding surface, and is positioned to frictionally engage such cartridges along their top sides when they are inserted into the shelf space below. This device would exhibit several deficiencies if applied to the retention of CD and other media cases.

For one, most CD cases are of the narrow, single-disc variety, and are, along with the wider multiple disk variety, made of hard plastic with sharp, 90° corners. These would tend to indent and catch upon such a compressible foam strip at the point of initial contact. This problem would be exacerbated by the fact that users often tip media cases at odd angles when inserting them into a shelf space. Though such a device may work well enough with the wide and uniformly tall microfilm cartridges described in the referenced patent, the pliability required to adequately conform to the abrupt and often narrow steps presented by variously wide and tall CD cases, which is absolutely necessary if all CD cases are to be securely held in place and their vacated spaces preserved as well, is not the quality required to smoothly guide them as they are being deposited. Furthermore, after many repeated deformations resulting from such contact, the bond between the compressible plastic foam strip and the surface material covering it would have to deteriorate only slightly before a significant degree of creeping or folding would occur, further impeding the smooth insertion of CD cases.

Though many holder/retaining device combinations have been put forth to store and organize CD and other media cases, no acceptable solution, simple or otherwise, has been presented. After careful consideration of relevant devices from prior art it is apparent that a more effective way of storing and organizing media cases, and especially CD cases, would be much appreciated by users.

SUMMARY, OBJECTS, AND ADVANTAGES OF THE INVENTION

The present invention provides a holder with retaining device to store and organize CD and other media cases, which are to be deposited so as to come to rest between and perpendicular to opposed shelves or other supports located adjacent to an access opening on the open side of the holder. On one or both of these shelves, depending on the preferred embodiment involved, is located a retaining device comprising two components, a guide and an engagement member, both of which run parallel to the access opening of the holder.

The engagement member is preferably an extruded tube-like structure made from a resilient plastic and having deformable, convex walls. The spacing of the opposed shelves is such that the engagement member is interposed between the interior surface of the shelf on which it is located and the proximate sides of deposited media cases, whereby it engages and becomes compressed by the proximate sides of deposited items, holding them in the exact place where they are deposited by a user. The guide is a rigid structure which, depending on the preferred embodiment involved, is either unified with the engagement member so that the retaining device is a continuous whole without separate parts, or the guide is integral to the same shelf on which the engagement member is then separately located.

In either case, the guide is situated between the engagement member and the access opening of the holder, and has a guide surface that is smooth and low frictional, and which serves to align incoming media cases with only that part of the engagement member meant to receive them. Because the functions of aligning and retaining media cases are handled by two specialized components, namely the guide and the engagement member, each of these components can perform in an ideal manner, with no compromise involved in their design or operation.

In a preferred embodiment of the retaining device the engagement member and guide are formed as a continuous, simultaneously extruded whole. In such a preferred embodiment the guide is preferably wedge shaped in profile, beginning with a tapered tip pointing towards the access opening of the holder, and with the engagement member attached to its rearward portion. The downward facing portion of the guide is an inclined guide surface running from the tip of the guide to the engagement member. In the same preferred embodiment, the guide and engagement member share a base with an attachment device consisting of a barbed flange which is to be inserted into a slot or kerf running the length of the shelf face on which the retaining device is to be located. In other preferred embodiments where the guide is integral to a portion of the holder, the guide surface may be inclined or not, but in all preferred embodiments the guide surface operates similarly, bearing the same functional relationship to incoming media cases and to the engagement member in all such embodiments.

The holder of my invention also has several preferred embodiments, in all of which the shelves or other such storage-area-defining structures between which deposited items come to rest are opposed to one another and are equidistantly spaced. In the first preferred embodiment of the holder with retaining device, portions of the holder define a storage area that is substantially rectangular. A variation of that first preferred embodiment orientates the holder with retaining device for access from above. In another preferred embodiment the holder has shelves that are upwardly curved, presenting a highly unique profile as seen from its access side, with a retaining device located on each shelf in opposition to that on the other. In yet another preferred embodiment the holder has shelves that are inclined and meet each other in the center, presenting the shape of an inverted V when viewed from the front.

All of these preferred embodiments of the holder with retaining device, and other possible embodiments related to them, are made possible by its unique structural and operational characteristics. Accordingly, it is the object of this invention to provide a device for organizing CD cases and other families of such substantially rectangular media cases, with the following advantages:

(a) to securely hold media cases in place regardless of variations commonly found in their widths and heights, or of how they are ordered relative to those dimensional differences;

(b) to accommodate the easy deposit, withdrawal and relocation of media cases, singly or plurally, to or from any available space;

(c) to retain media cases in a way that does not require that they be deposited or withdrawn with any special care or attention on the part of a user; and (d) to provide a holder and retaining device with mechanical and manufacturing characteristics which allow for differently styled and shaped embodiments.

Further objects and advantages are to provide a holder with a retaining device that is durable and long lasting, economical, compact and functionally subtle. Other objects and advantages will become apparent, to those skilled in the art, from the accompanying description and drawings.

Reference Numerals in Drawings

| | | | |
|---|---|---|---|
| 10 thru 10" | guide | 12 & 12' | base |
| 14 | guide surface | 16 thru 16" | tip |
| 18 thru 18''' | engagement member | 20 | base |
| 22 | transition segment | 24 thru 24" | retention face |
| 26 | barbed flange | 28 | barbs |
| 30 thru 30''''' | holder | 32 | access opening |
| 34 thru 34" | storage area | 36 thru 36'''' | shelf |
| 38 thru 38" | back wall | 40 thru 40''' | shelf |
| 42 | side wall | 44 | slot |
| 46 | channel | 48 | rib |
| 50 | CD case | 52 thru 52" | friction strip |

DESCRIPTION OF PREFERRED EMBODIMENTS OF THE INVENTION

Figure 1:
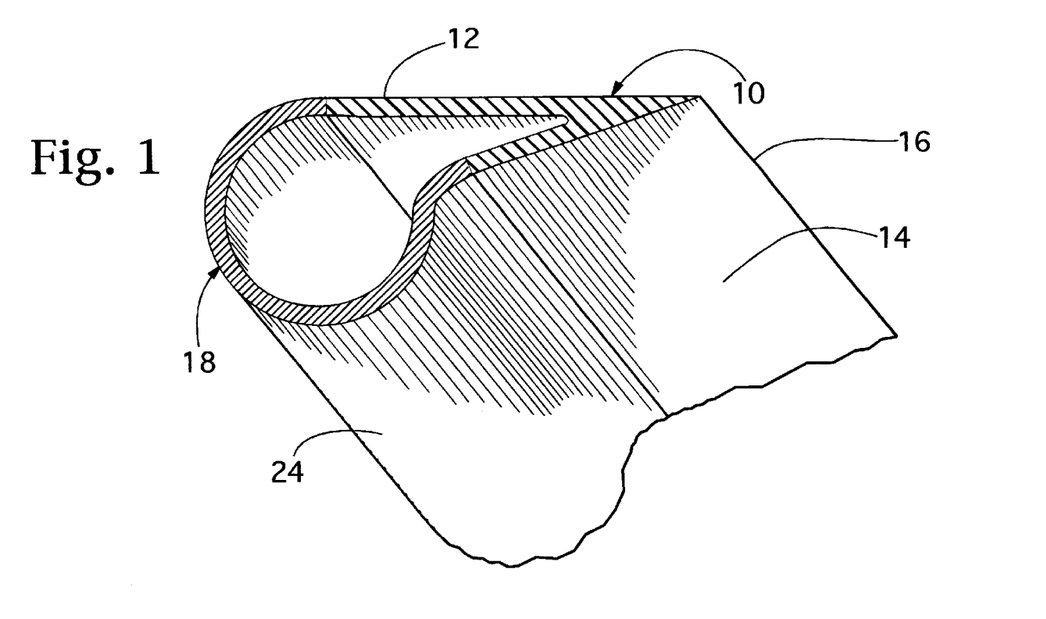
FIG. 1, in accordance with a first preferred embodiment of my invention, is an isolated, cross-sectional, cut-away view in perspective of the retaining device, consisting of an engagement member and a guide.
Figure 2:
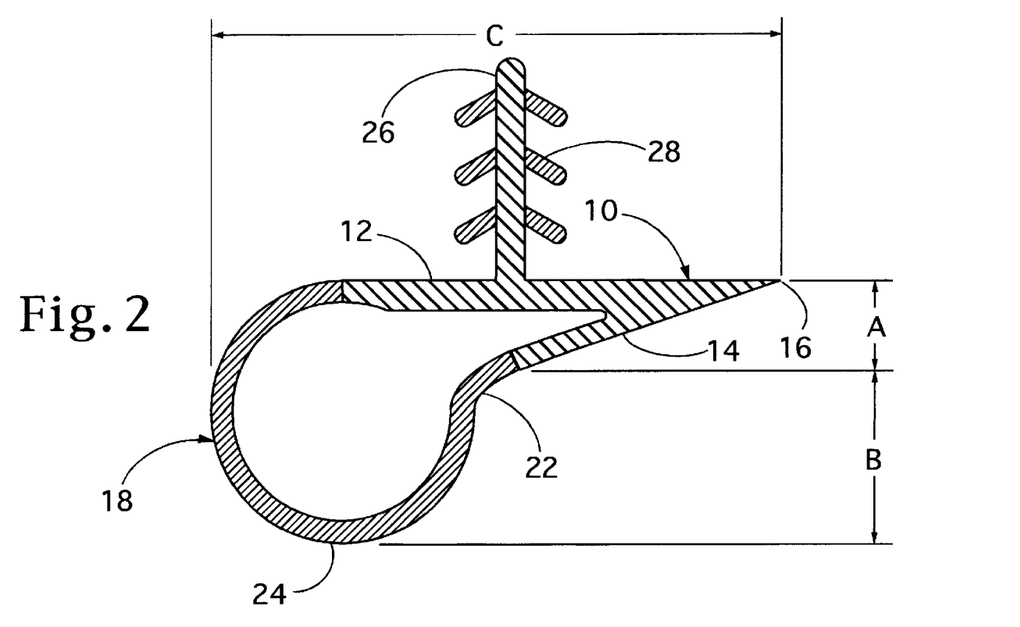
FIG. 2, in accordance with the first preferred embodiment of my invention, is a cross-sectional side view of the retaining device with a barbed flange for attaching it to a holder.

FIGS. 1 and 2 illustrate a first preferred embodiment of the retaining device of my invention, showing a guide 10 and an engagement member 18 which are acceptably simultaneously extruded from one or more plastics, though preferably from one plastic but in different hardnesses or durometers, to form a continuous, elongated body of variable length. The specialized functions of guide 10 and engagement member 18 are best realized when each is made in hardnesses and with the surface-drag characteristics appropriate to them. This mix of different properties (and even types of plastic) in a single extrusion is known as a co-extrusion. A thermoplastic rubber known as Santoprene has been found to be an excellent material from which to co-extrude the retaining device, due to its availability in the required hardnesses or durometers, attainability of desirable surface-frictional coefficients, great resilience, high resistance to fatigue and abrasion, long life, and moderate cost. (Santoprene is a product of Monsanto Company, and is available from Advanced Elastomer Systems of St. Louis, Mo.) Other thermoplastics or extrudable materials with the necessary properties are also possible. All specified durometers are based upon the use of Santoprene, though other durometers may be satisfactory with this or other extrudable materials.

Guide 10, in accordance with this first preferred embodiment of my invention, is preferably a firm, wedge-like structure with a base 12 that is flat and which forms an acute angle at a tip 16 with a guide surface 14. Guide surface 14 is smooth and preferably low frictional. Engagement member 18 is an elongated resilient structure that is hollow, resembling a partial tube in profile, having a deformable and mostly convex wall that is joined to guide 10, at the termination of guide surface 14, and to base 12. A durometer of approximately 64A provides the degree of resiliency and moderate surface-drag desirable for the functioning of engagement member 18. A durometer of approximately 52D results in the rigidity and low surface-drag necessary for guide 10. If, for whatever reason, guide 10 and engagement member 18 were to be made from only a single durometer or hardness of plastic, it would be that of engagement member 18, as a certain resilience and moderate surface-drag are essential to the optimal performance of engagement member 18. Guide surface 14 would then have an increased surface-drag, but would still function adequately.

FIGS. 1 and 2 show other parts of the first preferred embodiment of my invention. A transition segment 22 flexibly supports engagement member 18 while providing resistance to any tendency of engagement member 18 to roll in the direction of in-coming or out-going media cases. A retention face 24 is a downward facing portion of the wall of engagement member 18. Engagement member 18 has a wall thickness preferably in the range of 0.025" to 0.035", predetermined to provide the necessary combination of resilience, conformability, and resistance to compression required for its proper functioning.

FIG. 2, in accordance with the first preferred embodiment of my invention, shows a barbed flange 26 protruding perpendicular to base 12 with a plurality of barbs 28 obliquely projecting in the direction of base 12. Barbed flange 26 is preferably of the same durometer as base 12, and barbs 26 preferably match the durometer of engagement member 18.

FIG. 2 also shows some dimensional attributes important to the operation of this preferred embodiment of the retaining device. These overall dimensions are preferably kept to a minimum to maintain the efficiency and unobtrusiveness of the retaining device. Dimension A is at or about 0.125" and is partially the result of a preferred angle of 20° or less formed by guide surface 14 and base 12, which ensures that the uppermost leading corners of incoming CD cases will smoothly progress from tip 16 to transition segment 22. Dimension B is preferably at or about 0.25" to provide engagement member 18 with a range of compression calculated to accommodate CD cases with and without paperboard slipcases. Dimension C is approximately 0.875".

Figure 3:
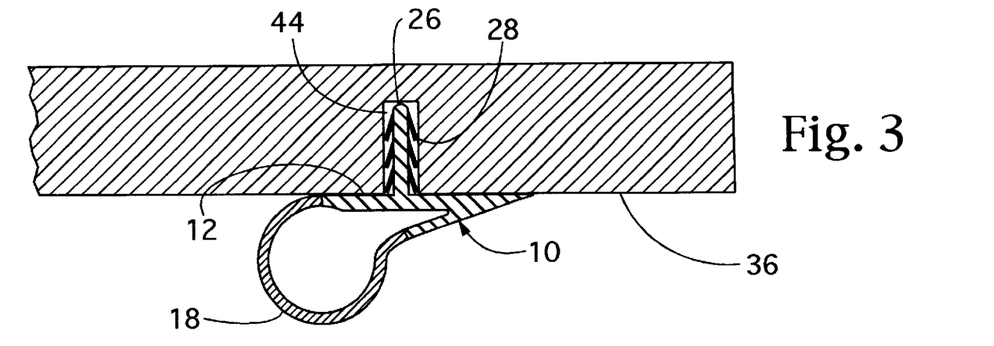
FIG. 3, in accordance with the first preferred embodiment of my invention, is a cross-sectional, cut-away, side view of the retaining device attached to a shelf.

FIG. 3 shows how the first preferred embodiment of the retaining device shown in FIG. 2 is preferably attached to a shelf 36, which has an elongated, continuous slot 44 running along its inner face. Slot 44 is sized so that when barbed flange 26 is inserted into it barbs 28 are pressed inwardly, thereby locking the entire retaining device in place, with base 12 resting against the proximate face of shelf 36. Other methods of attaching the retaining device of the first and other preferred embodiments to a shelf or other functionally similar structure may vary depending on the particular materials and structures involved. Included among these other methods are glued-in flanges, adhesives applied directly to a flat base, T-Slots, clips, and sonic welding. Wood and plastic are among the acceptable rigid materials from which to fabricate such a holder, with wall and shelf thicknesses, and structural configurations depending on the properties and engineering requirements of the materials involved.

Figure 4:
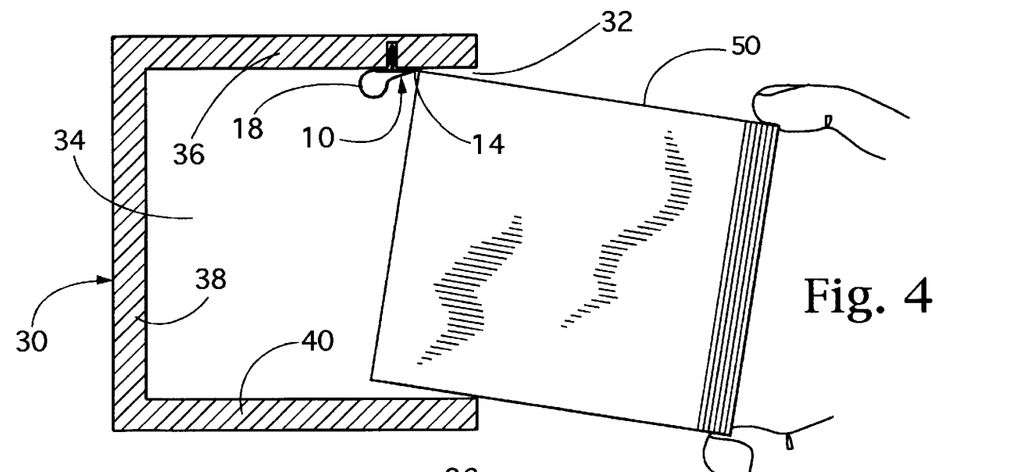
FIG. 4, in accordance with the first preferred embodiment of my invention, is a cross-sectional, side view of the holder with retaining device cooperating with a partially inserted CD case.

FIG. 4, in accordance with the first preferred embodiment of my invention, shows a cross section of a holder 30 with wall structures defining a rectangular interior space, including a shelf 36 opposed to a shelf 40, a back wall 38, and an access opening 32 for access to storage area 34 within. Media cases, such as a CD case 50, are deposited so as to come to rest in an upright, side-by-side manner, perpendicular to the supporting surface of shelf 40. Shelf 36 and shelf 40 are spaced apart by a distance equal to the space occupied by deposited media cases plus that of engagement member 18 interposed between them and the interior face of shelf 36. The retaining device is attached to the interior side of shelf 36, preferably in the fashion already shown in FIG. 3, and runs parallel to the open side of holder 30.

FIG. 4 also shows CD case 50 partially inserted into storage area 32 of holder 30 to the point where the leading upper corner of CD case 50 is contacting guide surface 14 just past tip 16 (FIGS. 1 & 2). CD case 50 is shown being inserted somewhat inclined, relative to the planes of the interior surfaces of shelf 38 and shelf 40. Users typically pay little attention to whether they are tipping a media case in some manner such as this. No matter, the pointed beginning of guide 10 at tip 16 and low frictional resistance and slight angle of guide surface 14 combine to consistently direct the leading corner of in-coming media cases 50 towards the proper area of engagement member 18 regardless of the entry angle of CD case 50. Also, because guide 10 limits which area of engagement member 18 is contacted by incoming or already deposited media cases, low wear and long service of engagement member 18 is ensured.

Figure 5:
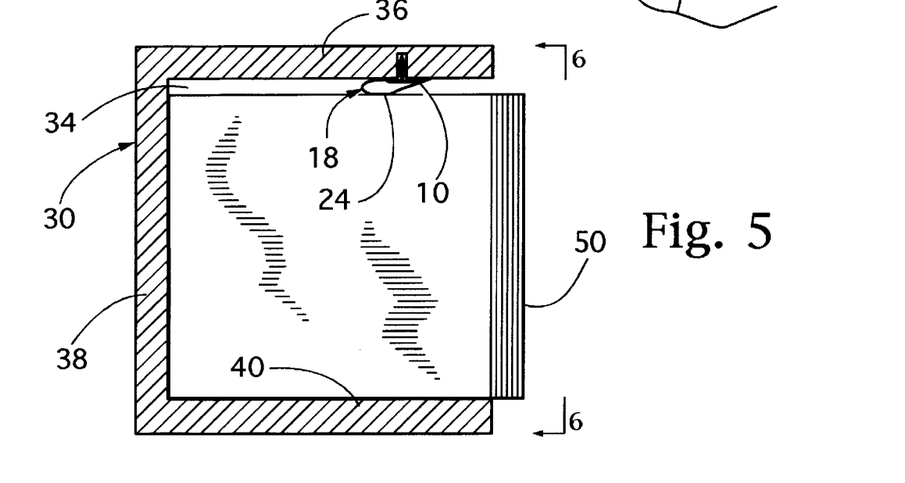
FIG. 5, in accordance with the first preferred embodiment of my invention, is a view similar to FIG. 4, but with a fully inserted CD case.

FIG. 5 shows CD case 50 fully inserted into storage area 34 of holder 30 and at rest on the interior surface of shelf 40. Engagement member 18 is here partially compressed, engaging and frictionally holding CD case 50 in place along retention face 24. For optimal functioning it has been determined that engagement member 18 should be located so as to contact fully deposited CD case 50 at a point two thirds of its total depth forward from the interior surface of back wall 38, or one third of its total depth back from its outward-facing side. It can also be seen that shelf 36 and shelf 40 are shallower than CD case 50, leaving a portion of CD case 50 protruding by which users may selectively grasp it for deposit and withdrawal.

It is important to point out that the various preferred embodiments of my invention work so effectively because the functions of guiding and retaining deposited items are here provided by two well integrated and specialized components, guide 10 and engagement member 18, which are optimally designed to play only their part of the overall retaining function. In order to clarify this aspect of my invention it will be useful to review the foregoing description at this time, but from a purely operational perspective, while keeping in mind that the basic mechanical actions of the following process are common to all other preferred embodiments as well.

When a user inserts CD case 50 into the storage area of holder 30 (FIG. 4), its uppermost leading corner encounters tip 16 (FIGS. 1 & 2) at the thin portion of guide 10, and proceeds along guide surface 14 (FIG. 4) to transition segment 22 (FIG. 2), which then continues to guide the leading corner of CD case 50 while flexing and transferring the resulting mechanical force to the entire body of engagement member 18, which gradually deforms to assume a more flattened or elliptical profile, allowing the leading corner of CD case 50 to smoothly proceed past retention face 24 (FIG. 5). CD case 50 becomes squeezed between the supporting surface of shelf 40 and engagement member 18 (FIG. 5), is stopped by back wall 38 (FIG. 5), and is held in place by frictional resistance along retention face 24, with counterpressure provided by the overall resilient structure of engagement member 18.

Figure 6:
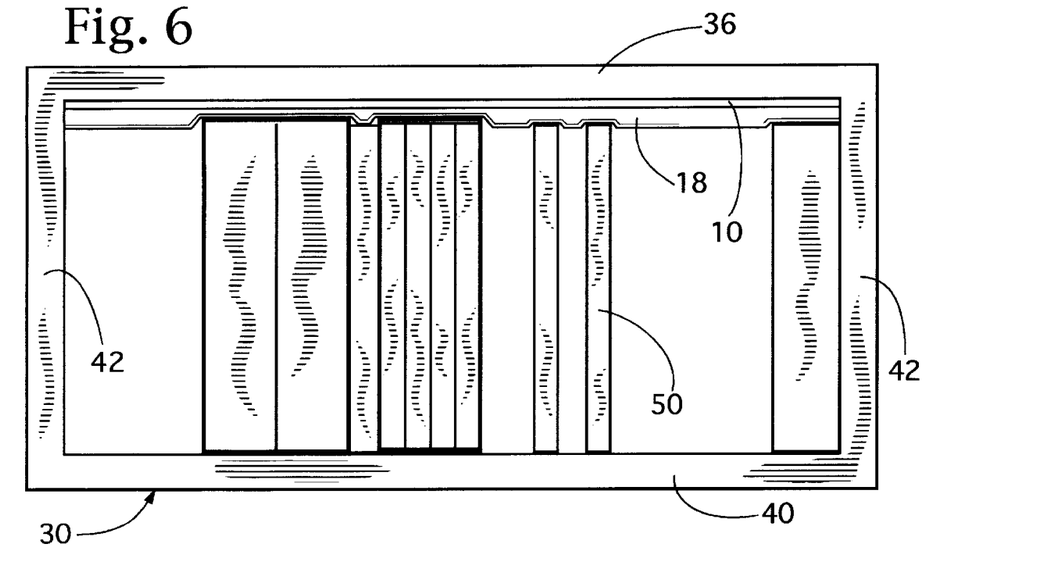
FIG. 6, in accordance with the first preferred embodiment of my invention, is a front view of the holder with retaining device organizing a plurality of CD cases.

FIG. 6, in accordance with the first preferred embodiment of my invention, shows holder 30 as seen from its access side, revealing opposed side walls 42 in addition to the other wall structures already seen in FIGS. 4 and 5. This frontal view illustrates the typical book-like fashion in which CD cases 50, and media cases in general, are typically stored. It can also be seen how engagement member 18 closely conforms to and frictionally holds a plurality of CD cases 50 in various combinations of number, width and height resulting from the number of discs some are made to contain, and from some being slipped into paperboard slipcases. Spaces left by withdrawn CD cases and saved for their later return are also visible between CD cases 50 pictured.

Because engagement member 18 has a smooth and continuous surface, CD and other media cases can be laterally shifted to adjacent spaces, singly or in groups, without being withdrawn from the shelf space where they are being stored. All that is required is for the user to slide them sideways in the desired direction. It can also be seen that the retaining device runs continuously along the entire length of storage area 34, regardless of what that specific length may be.

Figure 7:
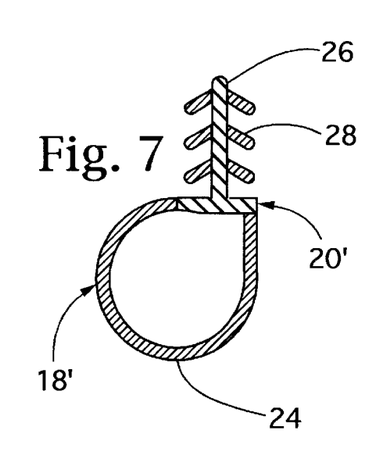
FIG. 7, in accordance with a second preferred embodiment of my invention, is a cross-sectional, side view of a separately formed engagement member with a base and a barbed flange for attaching it to the holder.

FIG. 7, in accordance with a second preferred embodiment of my invention, shows engagement member 18' formed as a separate component of the retaining device, with a base 20', barbed flange 26 and barbs 28 formed as part of the same extrusion, and preferably a co-extrusion with properties similar to those of the first preferred embodiment.

Figure 8:
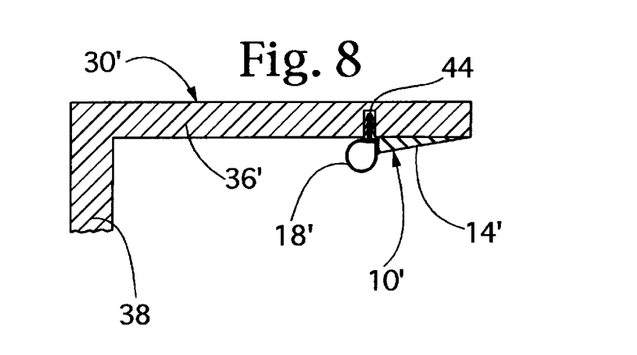
FIG. 8, in accordance with a third preferred embodiment of my invention, is a cross-sectional, cut-away, side view of the holder with retaining device, with the guide formed integrally to a shelf of the holder.

FIG. 8, in accordance with a third preferred embodiment of my invention, shows a portion of holder 30' (which is similar to holder 30 except as specified in this embodiment) where guide 10' is made integral to the structure of shelf 36'. Engagement member 18' (the embodiment shown in FIG. 6) is, in this third preferred embodiment, a separately formed component of the retaining device, and is attached to slot 44 running the length of the interior side of shelf 36'. In this embodiment guide surface 14' is an inclined portion of the interior surface of shelf 36' lying between engagement member 18' and tip 16'. It is important that the gap between the termination of guide surface 14' and engagement member 18' be nonexistent or preferably limited to $\frac{1}{16}$th of an inch or less, so that the leading corners of incoming CD cases don't catch on the side of engagement member 18'. This close proximity will also prevent engagement member 18' from rolling in the direction of media cases 50 as they are being withdrawn. This third alternate embodiment, where shelf 36' is formed to provide guide surface 14', has an integrated functionality and aesthetic appeal which may appeal to certain manufacturers and users.

Figure 9:
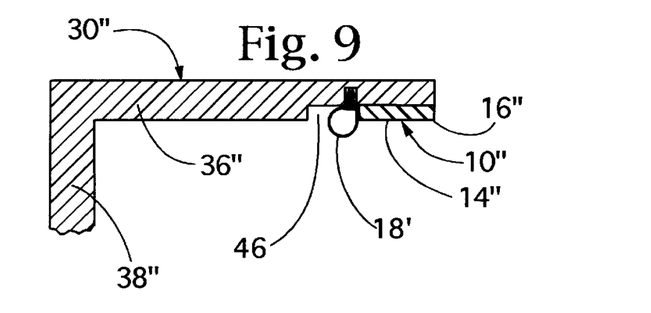
FIG. 9, in accordance with a fourth preferred embodiment of my invention, is a view similar to FIG. 8, with the guide made integral to, and the engagement member recessed into a shelf of the holder.

FIG. 9, in accordance with a fourth preferred embodiment of my invention, shows a preferred embodiment of the invention which is similar to that of the preceding embodiment. Engagement member 18' is here recessed into a channel 46 running the length of the interior side of shelf 36" of holder 30" (which is similar to holder 30 unless otherwise noted). A portion of shelf 36" incorporates guide 10', and the interior surface of shelf 36" extending from engagement member 18' to tip 16", serves as guide surface 14". One result of this embodiment is a small reduction in the distance between shelf 40 (FIGS. 4, 5 and 6) and shelf 36", equal to the amount that engagement member 18' is recessed into channel 46, which could acceptably be in the vicinity of 0.125". Any such reduction would decrease the overall height of a media case holder having a plurality of storage areas situated one above the other, where the cumulative effect could be substantial.

Figure 10:
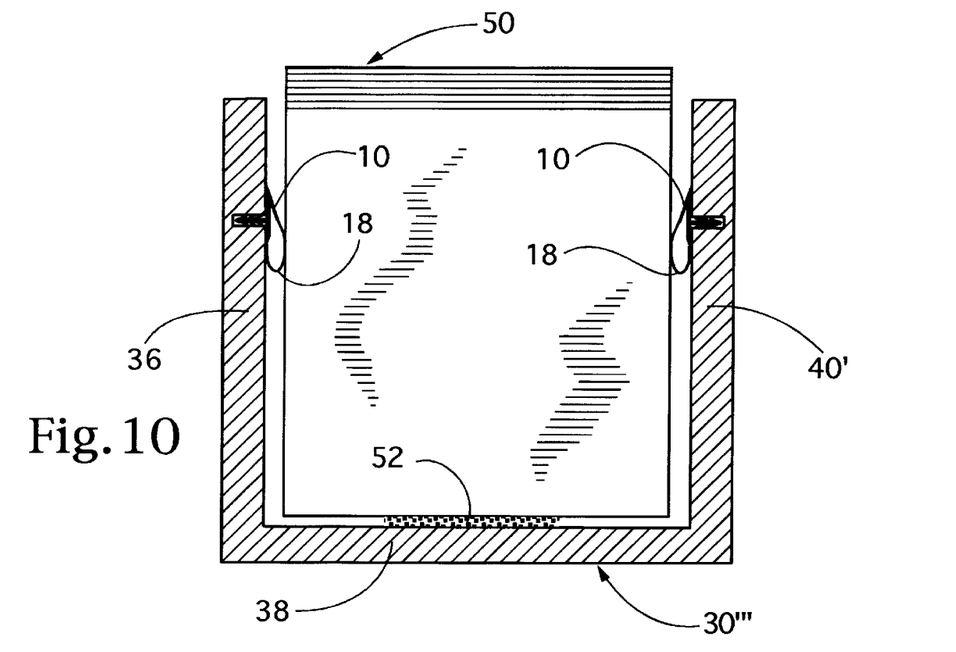
FIG. 10, in accordance with a fifth preferred embodiment of my invention, is a cross-sectional, side view of the holder with retaining device, preferably orientated for access from above.

FIG. 10, in accordance with a fifth preferred embodiment of my invention, shows an alternate embodiment where holder 30''' is similar to holder 30, but rotated 90° so that it sits on back wall 38, with access opening 32 facing upward. CD case 50 is deposited into the storage area from above, and is guided and held in place by opposed guides 10 and opposed engagement members 18 located along the lengths of the interior sides of shelf 36 and shelf 40'. CD case 50 comes to rest on the interior surface of back wall 38. Such an access-from-above holder would be very convenient in a pull-out drawer or beside an occupant in a vehicle, dual engagement members 18 providing added security against sudden motion and bumps. A friction strip 52, made of soft plastic foam, leather, or any such high-grab material, is located along the length of the interior surface of back wall 38 to provide added stability.

Figures 11, 12:
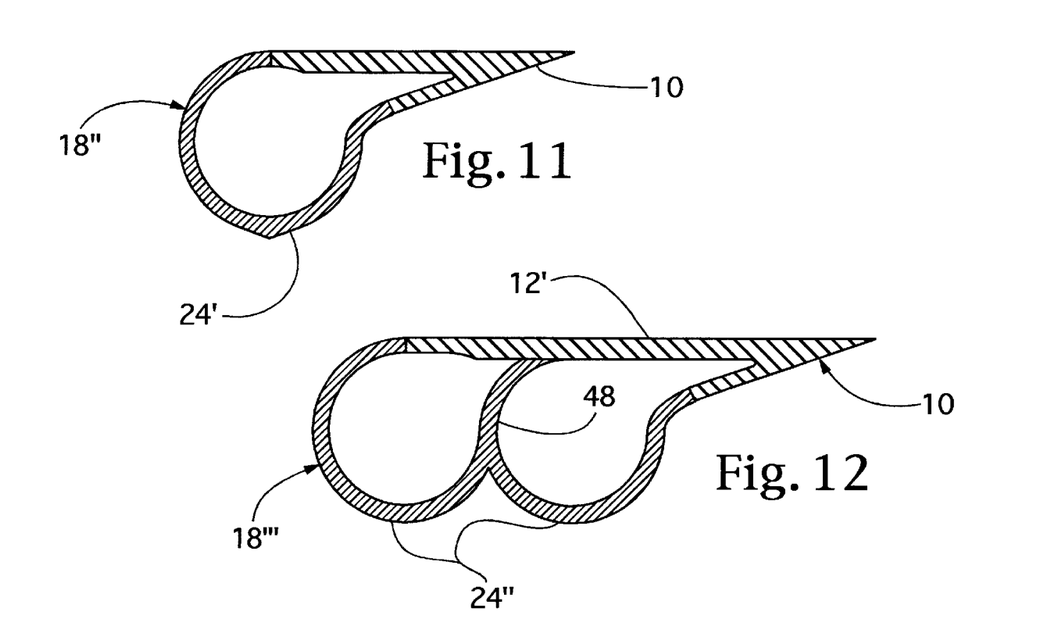
FIG. 11, in accordance with a sixth preferred embodiment of my invention, is a cross-sectional, side view of the retaining device with a cusp-like retention face.
FIG. 12, in accordance with a seventh preferred embodiment of my invention, is a cross-sectional, side view of the retaining device with dual retention faces.

FIG. 11, in accordance with a sixth preferred embodiment of my invention, shows an alternate embodiment of the retaining device where engagement member 18" has a retention face 24' with a cusp-like profile to provide somewhat greater grip along the textured or ridged sides typically found on plastic CD cases, thereby impeding movement in the direction that CD cases travel while being inserted and withdrawn. This would be beneficial in those applications requiring additional resistance to sudden motion or bumps.

FIG. 12, in accordance with a seventh preferred embodiment of my invention, shows an alternate embodiment of the retaining device where engagement member 18''' is a compound form of engagement member 18, now provided with two outwardly curved wall portions serving as retention faces 24". A portion of curved wall structure found in the first preferred embodiment is retained in this preferred embodiment as a rib 48 to anchor engagement member 18''' to base 12', for purposes of stabilizing the overall structure while still allowing it to properly flex and conform. One advantage of adding an additional retention face is the increased frictional grip provided thereby. This would prove useful where a holder or cabinet is subjected to sudden motion and bumps, as in a pull-out drawer or in a vehicle-mounted application.

Though media case holders and cabinets are typically box-like, having generally rectangular storage areas, other shapes and styles are possible with my invention. Because the engagement member is flexible, and because the guide may be in a form that is either flexible or integral to the holder, embodiments of my invention having storage areas defined by curved or angled structures are entirely acceptable so far as the functioning of the holder and retaining device are concerned. Two such versions are illustrated and described in the following two preferred embodiments for example and not limitation.

Figure 13:
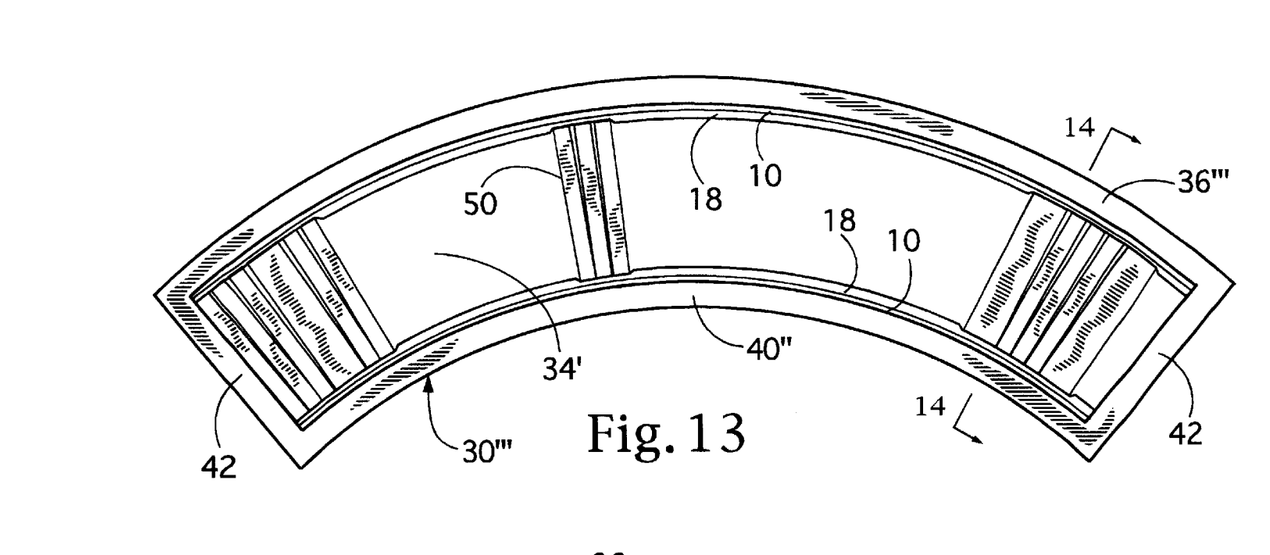
FIG. 13, in accordance with an eighth preferred embodiment of my invention, is a front view of the holder with retaining device with an arched storage area.

FIG. 13, in accordance with a tenth preferred embodiment of my invention, shows holder 30"" as seen from its open side, with engagement members 18 and guides 10 located on the interior sides of shelf 40" and shelf 36''', which are upwardly arched to form a curved storage area 34'. End walls 42 serve to further define storage area 34', as in preceding preferred embodiments. Opposed engagement members 18 are employed to provide adequate frictional grip against the pull of gravity against CD cases 50 deposited towards the more severely inclined ends of shelf 40". The degree of curvature of shelves 40" and 36''' are preferably limited only by what is aesthetically acceptable. Whatever the degree of curvature, shelf 40" and shelf 36''' could, in another preferred embodiment similar to the present one, continue their downward curve to form a 180° arc, thereby defining a storage area resembling a C resting on its termini.

Figure 14:
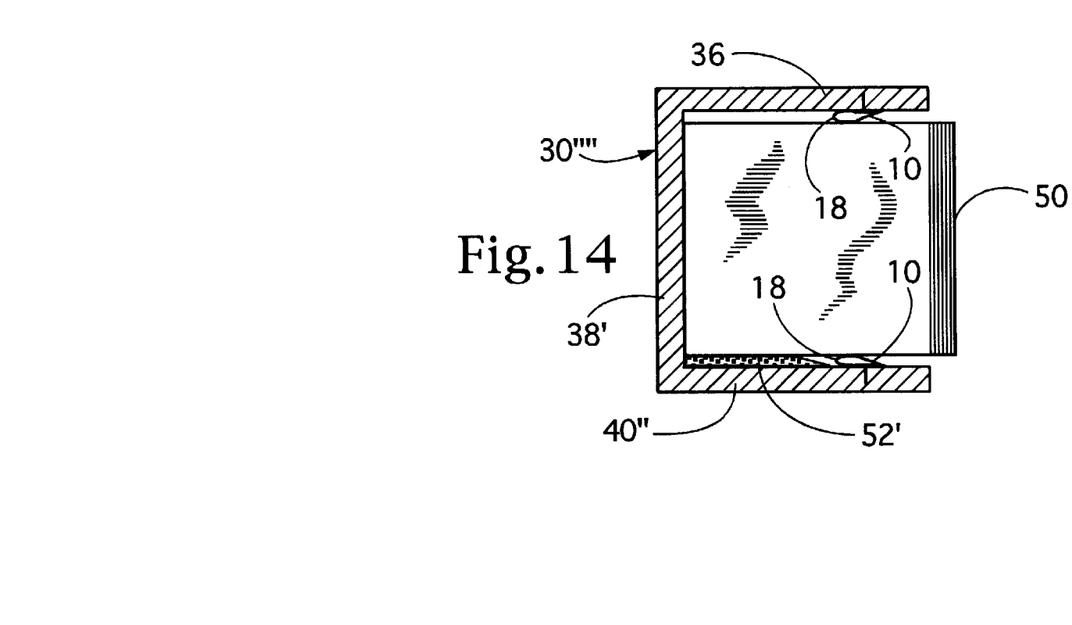
FIG. 14, in accordance with the eighth preferred embodiment of my invention, is a cross-sectional side view of the holder with retaining device shown in FIG. 13.

FIG. 14, in accordance with the tenth preferred embodiment of my invention, is a cross-sectional view showing additional features of this embodiment. Friction strip 52' is located on the interior surface of shelf 40" of holder 30"", between engagement member 18 and back wall 38', to provide additional frictional grip of CD cases 50, especially those resting on the interior surface of the severely inclined ends of shelf 40" (see FIG. 13), where the pull of gravity is greatest. It is possible to have a sharply inclined storage area, where CD cases 50 are held in a nearly horizontal position, with the arrangement illustrated in this preferred embodiment.

Figures 15, 16:
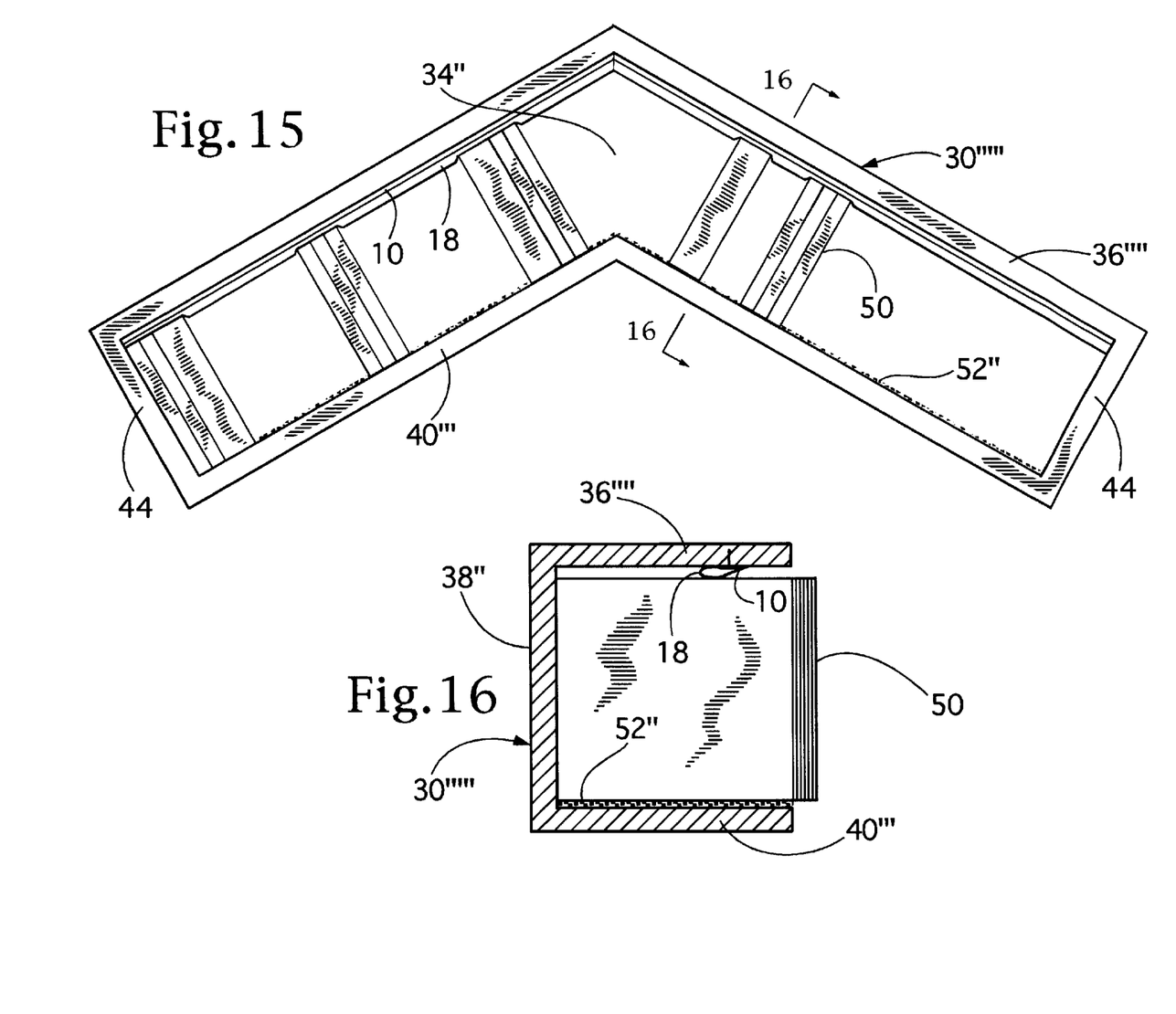
FIG. 15, in accordance with a ninth preferred embodiment of my invention, is a front view of the holder with retaining device with an angled storage area.
FIG. 16, in accordance with the ninth preferred embodiment of my invention, is a cross-sectional side view of the holder with retaining device shown in FIG. 15.

FIG. 15, in accordance with an eleventh preferred embodiment of my invention, shows holder 30""', with angled shelves 36"" and 40''' forming a storage area 34" having the shape of an inverted V. Engagement member 18 and guide 10 are located along the interior face of shelf 36"".

FIG. 16, in accordance with the eleventh preferred embodiment of my invention, shows friction strip 52"

located on the interior surface shelf 40''', preferably from back wall 38'' to the front of the holder, to provide frictional resistance against slippage of CD cases 50 along the inclined surface of shelf 40'''.

The preceding description has employed representations of the retaining device in combination with a sampling of preferred embodiments of the holder merely to impart a clear understanding of general structure and operation. Embodiments of my invention with holders having a plurality of storage areas are obviously included, while additional embodiments devised by simply altering the configuration, size, shape, interior, surface treatment, or relative position of parts of my invention are logically anticipated. Nonetheless, the preceding description has shown that the holder with retaining device of my invention holds and organizes CD and other media cases without the many tradeoffs and drawbacks found in other available devices, while additionally possessing several advantages over prior art, exemplified:

- by making any preferred space on a shelf or other such supporting structure available for the deposit of media cases;
- by effectively and securely retaining media cases precisely where they are deposited;
- by facilitating the easy deposit and withdrawal of media cases without any special care or attention on the part of the user;
- by holding media cases in their chosen location, whether isolated or adjacent to one another, regardless of their relative order on a shelf or, as with CD cases, of differences in their width and height;
- by simplifying and shortening the process of relocating media cases, singly or plurally, to other preferred locations;
- by providing a kind of positional memory which saves the vacated space of one or more media cases withdrawn from a group of adjacent media cases;
- by allowing empty spaces between media cases to be closed up merely by shifting any number of them sideways in the chosen direction;
- by aiding in the maintenance and neatness of a static or changing collection of media cases;
- by being mechanically and visually subtle;
- by not requiring that a holder's storage area be of any particular length, as the retaining device may be of any chosen length.
- by being durable and long lasting; and,
- by affording a variety of holder and cabinet shapes and styles.

Although certain preferred embodiments of my invention have presently been disclosed for illustrative purposes, it will be understood that, in view of this disclosure, various changes, modifications, and substitutions will suggest themselves to persons skilled in the art, and may be incorporated in such alternate embodiments without departing from the spirit and scope of my invention, which should be limited only by the claims below. Additionally, while it is intended that the scope of my invention include various alternate embodiments, it should be understood that the preferred embodiments disclosed herein include features and characteristics which are considered independently inventive. Accordingly, the disclosure of variations and alterations exemplified in the preferred embodiments is intended only to reflect on the breadth of the scope of my invention without suggesting that any of the specific features and characteristics of any particular preferred embodiment are in any way obvious or unimportant.

I claim:

1. An elongated extruded plastic device for releasably storing a media container between a parallel pair of shelves, the device comprising:

a hollow engagement member having a wall whose outer circumference corresponds to somewhat more than half a cylinder;

a guide and base member of generally V-shaped cross-sectional configuration having a rigid tip portion that defines a relatively sharp edge, one wall of the guide and base member forming a base for attachment of the guide member to one of the shelves, that one wall of the guide and base member having its otherwise exposed longitudinal edge attached to one longitudinal edge of the engagement member with a smooth outer joining surface, the other wall of the guide and base member having a low-friction outer surface adapted to receive the media container to be retained in a sliding relationship therewith, and to guide its movement into engagement with the engagement member; and the device also having a transition segment that joins the otherwise exposed longitudinal edge of the other wall of the guide and base member to the other longitudinal edge of the engagement member with a smooth outer joining surface, the transition segment having a reverse inflection such that it smoothly joins both the guide and base member wall and the engagement member edge;

whereby the operation is such that the media container may be normally retained between the shelves by compressive engagement with the engagement portion of the device.

2. The device of claim 1 which also includes means for securely attaching the one wall of the guide and base member to a shelf.

3. An elongated extruded plastic device for releasably retaining a media container adjacent a shelf, comprising:

a guide and base member of generally V-shaped cross-sectional configuration having a rigid sharp-edged tip portion;

a hollow engagement member having a wall whose outer circumference corresponds to somewhat more than half a cylinder;

an otherwise exposed longitudinal edge of one wall portion of the guide and base member being attached to one longitudinal edge of the engagement member and forming a smooth outer joining surface so as to provide a flat base for attachment of the device to the shelf;

the other wall portion of the guide and base member having a low-friction outer surface adapted to receive the media container in a sliding relationship, the device also including a transition segment which joins the otherwise exposed longitudinal edge of the other wall of the guide and base member to the other longitudinal edge of the engagement member, the transition segment having a reverse inflection with a smooth outer joining surface so as to guide the movement of the media container into engagement with the engagement member;

such that the media container may be normally retained adjacent the shelf by compressive engagement with the engagement portion of the device.

4. The device of claim 3 including means for securely attaching the one wall of the guide and base member to a shelf.

5. The device of claim 3 which is integrally formed.

* * * * *